US009413536B2

(12) United States Patent
Hui et al.

(10) Patent No.: US 9,413,536 B2
(45) Date of Patent: Aug. 9, 2016

(54) REMOTE SECURE DEVICE MANAGEMENT IN SMART GRID AMI NETWORKS

(71) Applicant: Cisco Technology, Inc., San Jose, CA (US)

(72) Inventors: Jonathan W. Hui, Belmont, CA (US); Raja Rajaram Kannan, Milpitas, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 14/303,122

(22) Filed: Jun. 12, 2014

(65) Prior Publication Data

US 2015/0365238 A1  Dec. 17, 2015

(51) Int. Cl.
*H04L 29/06* (2006.01)
*H04L 9/32* (2006.01)

(52) U.S. Cl.
CPC .............. *H04L 9/3247* (2013.01); *H04L 9/321* (2013.01); *H04L 9/3252* (2013.01); *H04L 9/3263* (2013.01); *H04L 9/3297* (2013.01)

(58) Field of Classification Search
CPC .......... H04L 9/3247; H04L 9/32; G06F 21/60
See application file for complete search history.

(56) References Cited

U.S. PATENT DOCUMENTS

| 7,386,721 | B1 | 6/2008 | Vilhuber et al. |
| 7,451,305 | B1 | 11/2008 | Pritikin |
| 8,095,788 | B2 | 1/2012 | Vilhuber et al. |
| 8,341,250 | B2 | 12/2012 | Pritikin et al. |
| 8,650,394 | B2 | 2/2014 | Vilhuber et al. |
| 8,732,279 | B2 | 5/2014 | Nedeltchev et al. |
| 2010/0077217 | A1* | 3/2010 | Callaghan ............... G06F 21/33 713/175 |
| 2010/0241848 | A1* | 9/2010 | Smith .................... G01D 4/004 713/153 |
| 2012/0137126 | A1 | 5/2012 | Matsuoka et al. |
| 2012/0246473 | A1 | 9/2012 | Oba et al. |
| 2012/0297198 | A1 | 11/2012 | Danezis et al. |

FOREIGN PATENT DOCUMENTS

| EP | 2523139 A1 | 11/2012 |
| WO | 2013117404 A1 | 8/2013 |

OTHER PUBLICATIONS

IEEE, "IEEE Standard for Local and metropolitan area networks—Part 15.4: Low-Rate Wireless Personal Area Networks (LR-WPANs)," IEEE Std 802.15.4™—2011, Sep. 5, 2011, 314 pages.

* cited by examiner

*Primary Examiner* — Izunna Okeke
(74) *Attorney, Agent, or Firm* — Edell, Shapiro & Finnan, LLC

(57) ABSTRACT

Presented herein are techniques for securely configuring or managing devices in a variety of geographic locations. At a device manager for a device, a first public key of a first public-private key pair is presented to a network management system as part of a request for one or more work orders. The work order, generated and signed by the network management system using a second private key of a second public-private key pair, includes the first public key, and is received by the device manager. The signed work order is provided to the endpoint device for validation of the signed work order using a second public key, and all subsequent communications from the device manager to the endpoint device are sent such that the communications are signed with the first private key. In some embodiments, each work order is valid for a specified amount of time.

20 Claims, 11 Drawing Sheets

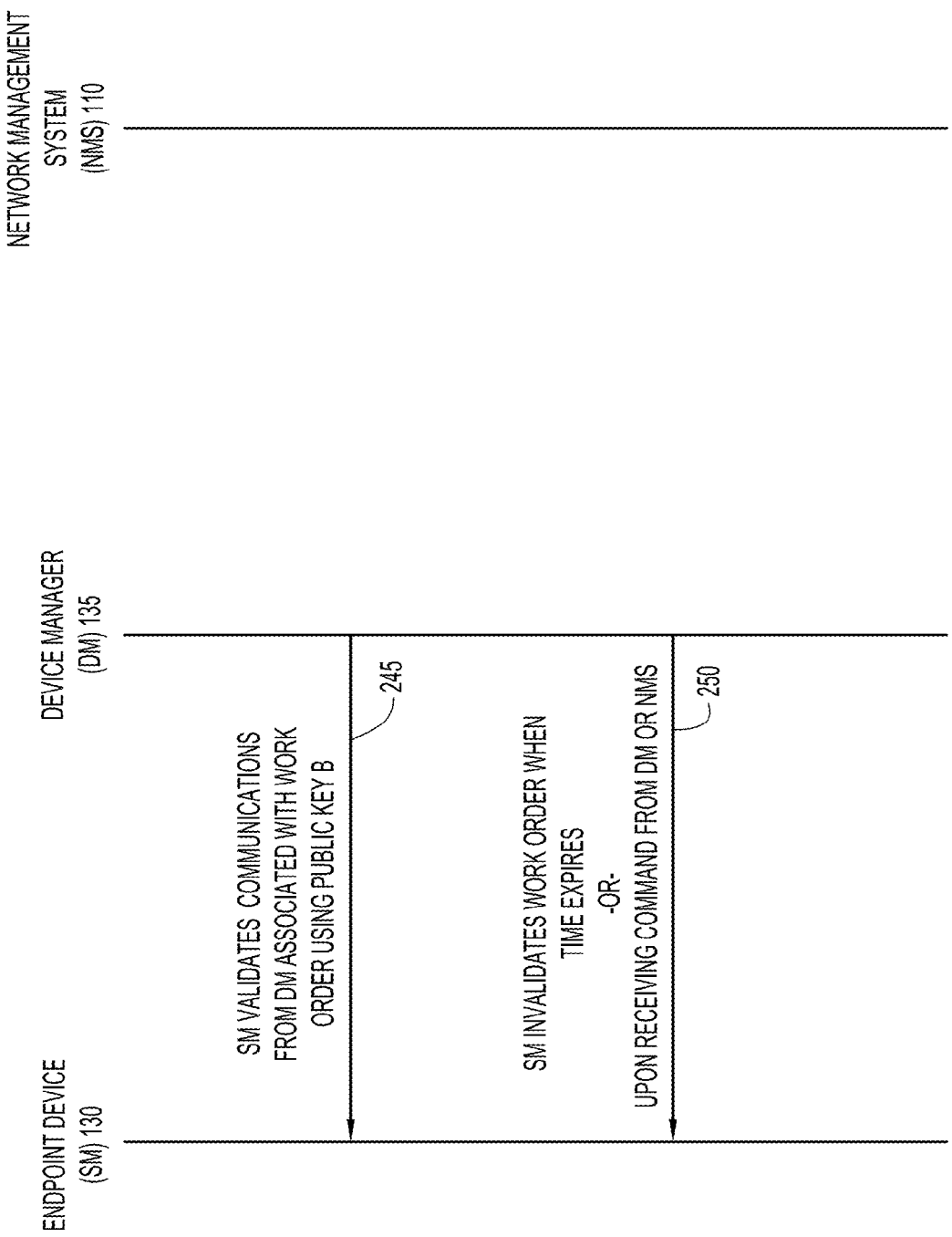

| Work Orders | | | | | | | | root ▼ | Time Zone: IST |
|---|---|---|---|---|---|---|---|---|---|

| Add Work Orders | Edit Work Orders | | Delete Work Orders | | | Displaying 1-4 of 19 ◁◁ ◁ | Page 1 of 1 ▷ ▷▷ | 50 | ▶ |
|---|---|---|---|---|---|---|---|---|---|
| ☐ Work Order Number 310 | Work Order Name | Role | FAR Name 340 | Technician User Name 350 | Time Zone | Start Date 330 | End Date | Last Update 810 | Status |
| ☐ LFKZZAIX | audit-trail | admin | CGR1120/K9+JAF1720BFKE | root | India Standard Time | 2014-03-17 12:00:00 | 2014-03-25 12:00:00 | 2014-03-17 05:58:21.0 | In Service |
| ☐ ZPESNUXP | sfsdf | admin | CGR1120/K9+JAF1720BFKE | user1 | India Standard Time | 2014-03-17 12:00:00 | 2014-03-25 12:00:00 | 2014-03-17 05:47:36.0 | Assigned |
| ☐ PLIPQUQE | viewer_roll | viewer | CGR1120/K9+JAF1720BFKE | root | India Standard Time | 2014-03-17 12:00:00 | 2014-03-24 12:00:00 | 2014-03-17 05:16:11.0 | Assigned |
| ☐ NDQDHYIB | version change | tech | CGR1120/K9+JAF1720BFKE | root | India Standard Time | 2014-03-17 12:00:00 | 2014-03-18 12:00:00 | 2014-03-17 05:05:47.0 | New |

FIG.8

| Work Orders | | | | | | |
|---|---|---|---|---|---|---|
| WORK ORDER NUMBER | Description | Device Model | Start Date | Time Remaining | Status | Device Name |
| ODZYECKR | expired-wo | CGR1120 | Sunday, March 16, 2014 9:15:... | Expired | ◯ New | CGR1120/K9+JAF17.... |
| LFKZZAIX | audit-trail | CGR1120 | Monday, March 17, 2014 6:30:... | 7 Day(s) | ◯ New | CGR1120/K9+JAF17 |
| DYPKVANS | testyyy | CGR1120 | Monday, March 17, 2014 6:30:... | 6 Day(s) | ◯ New | CGR1120/K9+JAF17 |

[ Connect ]

FIG.9

REMOTE SECURE DEVICE MANAGEMENT IN SMART GRID AMI NETWORKS

TECHNICAL FIELD

The present disclosure relates to securely configuring and managing devices, including endpoint devices located in remote geographic locations.

BACKGROUND

Smart Grid Advanced Metering Infrastructure (AMI) networks are composed of millions of smart meter devices, embedded in physical locations with limited security. Typically, these devices are configured for deployment in a factory setting. Such devices may need to undergo additional configuration or maintenance, once deployed in the field.

BRIEF DESCRIPTION OF THE DRAWINGS

FIGS. 2A-2C illustrate a ladder diagram depicting operations between a network management system, a device manager and an endpoint device, according to the techniques disclosed herein.

FIG. 8 is an example of a screenshot showing a list of work orders generated by a network management system, according to an example embodiment.

FIG. 9 is an example of a screenshot showing a device manager with multiple work orders, according to an example embodiment.

DESCRIPTION OF EXAMPLE EMBODIMENTS

Overview

Figure 1:
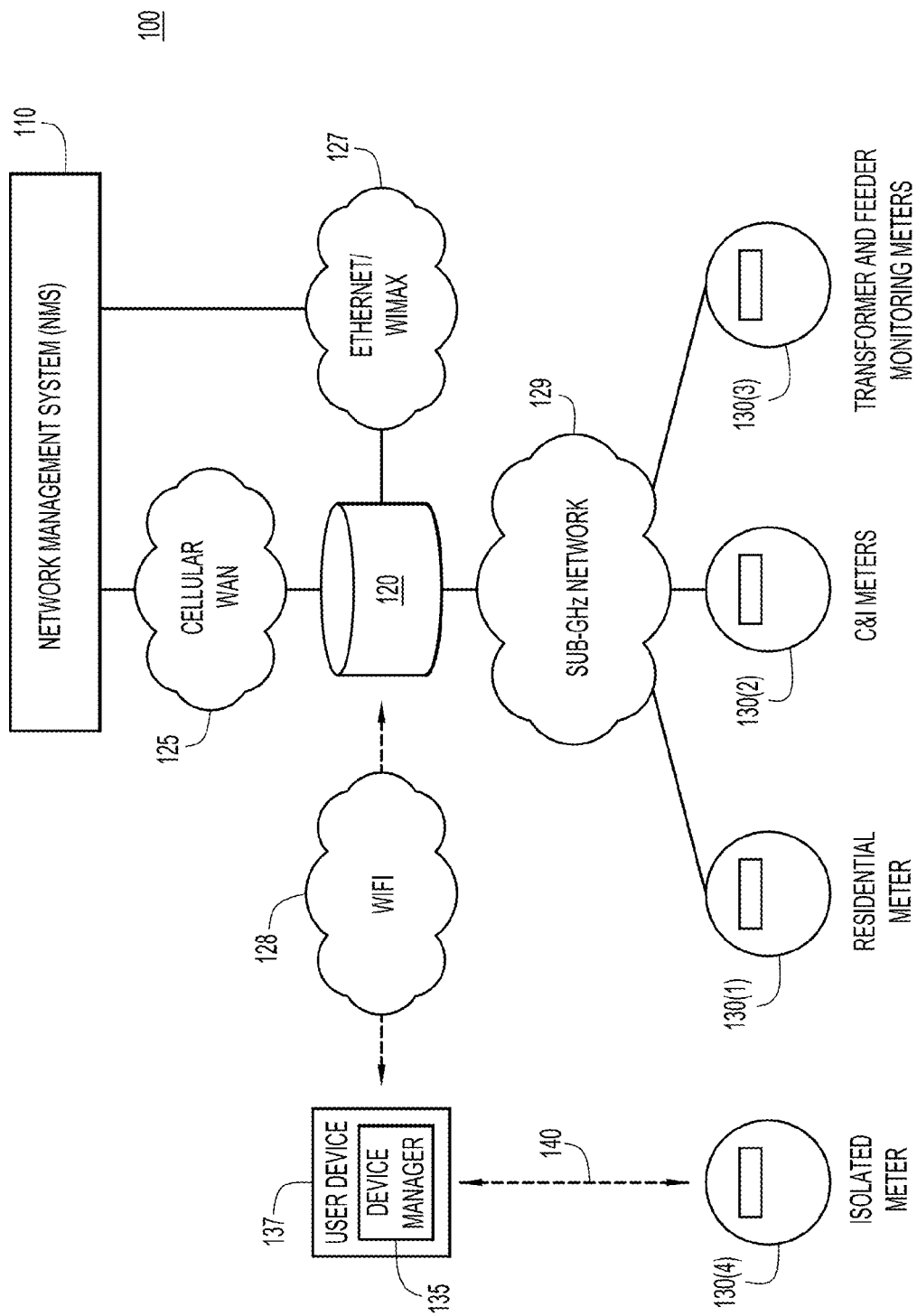
FIG. 1 is a block diagram of a network topology in which the techniques disclosed herein may be employed according to an example embodiment.

Presented herein are techniques for securely managing endpoint devices in a variety of geographic locations. At a device manager for an endpoint device, a first public key of a first public-private key pair is presented to a network management system as part of a request for one or more work orders, the work order comprising information used to configure and/or manage an endpoint device in a secure manner, wherein the information is specific to the endpoint device, associated with a user role, and valid for a specified period of time. The work order, which is received from the network management system, is signed using a second private key of a second public-private key pair, and includes the first public key. The signed work order is provided to the endpoint device for validation of the signed work order using a second public key, and all subsequent communications from the device manager to the endpoint device are sent such that the communications are signed with the first private key. In some embodiments, each work order is valid for a specified amount of time.

Example Embodiments

Smart Grid Advanced Metering Infrastructure (AMI) networks include millions of smart meter devices (referred to as endpoint devices herein), embedded in physical locations with limited security. Typically, these endpoint devices are configured in a factory setting, allowing for a "zero-touch" deployment process. The zero-touch deployment process involves connecting each endpoint device to a network, and configuring/registering the device with a Network Management System (NMS). Once the endpoint device is registered, the NMS may perform device-specific configuration/management activities over a link layer network (LLN). For example, Simple Management Protocols (SMP) protocols, based on a Constrained Application Protocol (CoAP), are designed to be used with simple electronic devices, and may be used to configure and/or manage grid mesh products. Smart grid devices generally do not have the resources to run more advanced protocols, e.g., Hypertext Transfer Protocol Secure (HTTPS) or Transmission Control Protocol (TCP), due to limited resources, and therefore, generally utilize a lightweight or simple protocol, such as SMP. SMP allows configuration of attributes (a set of fields), such as type, length and value fields, collectively referred to as TLVs. SMP may also define a TLV to store a signature based on Elliptical Curve Cryptography (ECC) in support of authentication.

In some cases, endpoint devices may be located in remote geographic locations, and be unable to connect via a network (e.g., WiFi™ or cellular network) to the NMS. In such situations, an authorized operator or technician may need to engage in "hands-on" configuration/management of an endpoint device, using, e.g., a device manager. The device manager may communicate directly with the grid mesh device using a console port, the LLN interface (e.g., IEEE 802.15.4), or any other suitable interface. Hands-on configuration/management may also be used to help diagnose hardware or software-related issues (e.g., hardware defects, configuration issues, etc.) preventing a node or endpoint device from being able to remotely connect to a network.

Some approaches for in-field management of endpoint devices rely on establishing a secure session via a network (e.g., HTTPS, etc.) in order to configure or manage endpoint devices, and typically consume a significant amount of resources, with communications involving long-lived traffic flows over a network between an endpoint device and a NMS. Other approaches for in-field device management involve simply restricting the number of commands (usually signed) that can be issued to an endpoint device in a field such that some commands are not allowed to be performed in the field. Further approaches include using tickets having a specified validity period and session key (a session key is generally a symmetric key, for single-use, for communication between a client and a server). However, such approaches usually involve ongoing communication with a managing server, and utilize tickets that are valid for a narrow period of time, e.g., valid only immediately after being issued. However, all of these approaches are suboptimal, requiring a network connection that may not be available, limiting commands that may be executed in the field, or having sub-optimal security measures.

Other possible approaches include: (a) installing a shared secret across all devices that may be used when signing SMP messages, (b) managing unique shared secrets for all devices, or (c) utilizing the NMS private key when signing SMP messages. Again, these approaches are not ideal. For instance, if a shared secret is compromised, all devices relying upon the shared secret may be compromised. Maintaining shared secrets is time-consuming and error-prone, requiring management of millions of devices. If a device manager, having the NMS private key, is lost or stolen, then the private key may be compromised.

Endpoint devices should be accessed in a controlled, secure manner. For instance, endpoint devices should only accept SMP communications that are properly authorized.

The embodiments presented herein encompass techniques of securely connecting to an endpoint device within a limited time window and configuring or managing the device using a "work order" workflow, without relying upon connecting to the NMS (e.g., over the LLN and through a backhaul), which is typically associated with long latencies. Typically, a device manager, once in the field, is not able to reach the NMS, which is usually behind a firewall. Thus, the embodiments presented herein involve techniques in which an endpoint device may be configured or managed in the field, without the endpoint device or the device manager connecting to a network. Unlike security mechanisms which require network connectivity (e.g., HTTPS, etc.), involve substantial consumption of resources, and have high latency IP-based traffic flows over a network, the embodiments presented herein use a single (or a few) exchanges between a device manager and an endpoint device, achieving robust configuration capabilities and efficient use of resources.

Techniques disclosed herein utilize SMP messaging (or any lightweight protocol) to interact with endpoint devices, e.g., smart meter devices. Due to limited resource constraints, SMP message protection mechanisms primarily rely on public key cryptography mechanisms (e.g., Elliptic Curve Digital Signature Algorithm (ECDSA), etc.) and sequence numbers. Sequence number attributes, as described herein, may be included in SMP messages to guard against replay attacks. Further, the techniques presented herein can issue any set of commands in any order, subject to a user role defined in a work order, for a limited window of time.

Referring to FIG. 1, a block diagram is shown of a field area network topology 100 including a NMS 110, a field area router 120, a plurality of endpoint devices, e.g., smart meter devices 130(1)-130(4) and associated networks, including cellular wide area network 125, Ethernet/WiMax™ network 127, WiFi™ network 128, and sub-GHz radio frequency network 129. Cellular wide area network 125 and Ethernet/WiMax™ network 127 may connect field area router 120 to NMS 110. Field area network router 120 has both WAN and Neighborhood Area Network (NAN) interfaces, with the NAN interfaces used to connect to endpoint devices via sub-GHz network 129. Endpoint devices, e.g., smart meter devices, 130(1)-130(3), are shown in a variety of locations, which are able to connect to field area router 120 using sub-GHz network 129. While endpoint devices 130(1)-130(3) are capable of connecting to a network, endpoint device 130(4) is an example of an endpoint device in a remote location, unable to access a network. In such a situation, a device manager 135, configured to run on a user device 137 may be used to configure or manage (e.g., provide updates, troubleshoot, etc.) an isolated endpoint device, such as endpoint device 130(4), as explained below.

An implementation of a device manager is shown at 135. A device manager may run on a laptop or any portable electronic device, hereinafter called a user device and shown at reference numeral 137. The user device 137 may connect by wire or wirelessly (or with an optical cable) with an endpoint device, e.g., endpoint device 130(4), as shown by dashed line 140. User device may also (optionally) communicate with field area router 120 via WiFi™ network 128. To manage and configure endpoint devices that are unable to connect to a network, a technician/operator in close physical proximity to the endpoint device, may utilize the user device 137 with the device manager 135 in accordance with the techniques disclosed herein to manage and configure the device. A device manager may be used to perform configuration, provide updates (e.g., updating firmware, etc.), and provide troubleshooting capabilities to an endpoint device.

Accordingly, techniques are presented herein for configuring and managing endpoint devices in situations in which the endpoint device is unable to connect to a network.

Techniques are presented herein for an endpoint device to authenticate commands from a device manager, without relying on network connectivity, or for that matter, having connectivity to any other device aside from the device manager. The device manager's ability to issue commands is limited in time to minimize the risk of damage should an unauthorized party gain access to the endpoint device (e.g., via a lost or stolen device manager). Specifically, configuring a public-private key pair to be unique to each device manager and corresponding work order, wherein the work order is specific to the endpoint device being managed, limits the scope of damage and provides increased security. Additionally, in some embodiments, the use of the public-private key pair may be temporary, limited by the time window provided by the NMS. However, the public-private key pair itself need not be temporary and may be used for future work orders.

It is also noted that smart grid AMI devices typically have a real time clock (RTC) with battery-backup, configured with an appropriate time setting in the factory before being deployed in the field, as such information is needed for determining peak time and off-peak time electrical usage. The RTC clock may be used for validating start times and end times of a work order, as described herein.

Figure 2A:
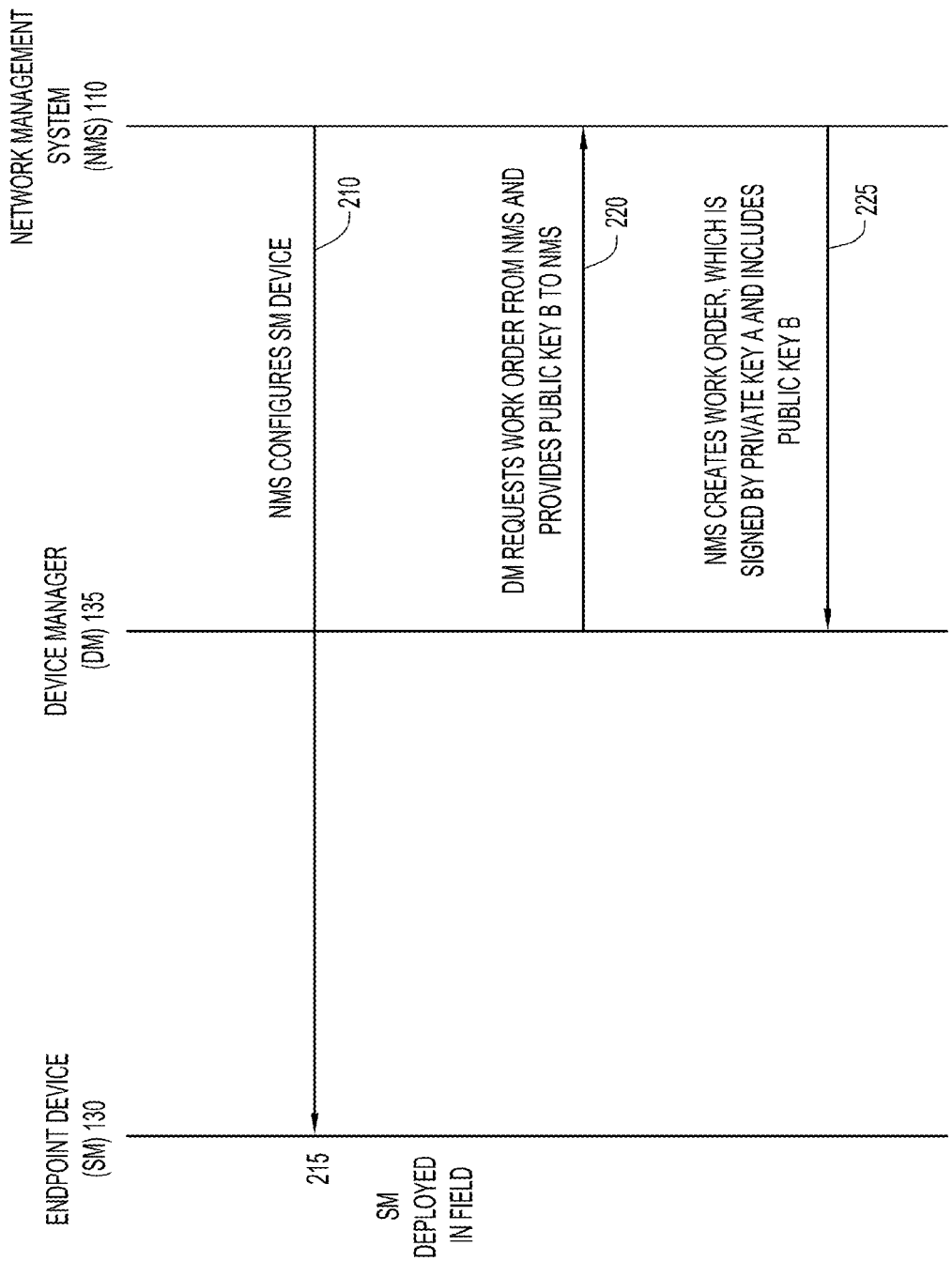
Figure 2B:
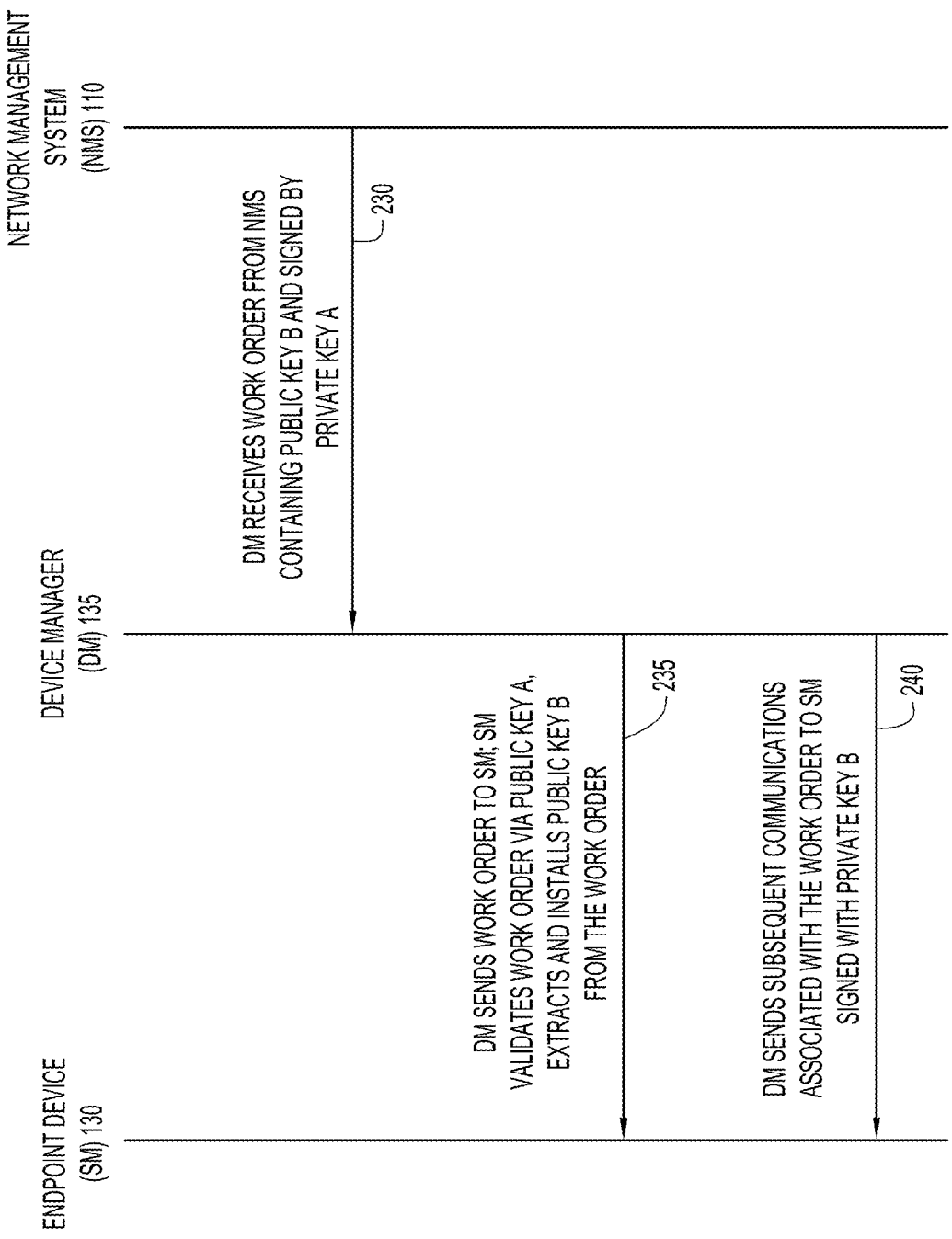

Reference is now made to FIGS. 2A-2C. FIGS. 2A-2C illustrate ladder diagrams depicting operations between an NMS 110, a device manager (DM) 135, and an endpoint device, e.g., smart meter (SM) 130, according to the techniques disclosed herein. A "work order" workflow is shown, which simplifies the operational overhead of using a device manager as well as provides a mechanism in which only authorized device managers (or equivalent) are authorized to manage and configure an endpoint device.

For the purposes of simplifying the description below, a public key of public-private key pair A is referred to as public key A, and a private key of the public-private key pair A is referred to as private key A. Similarly, a public key of public-private key pair B is referred to as public key B, and a private key of the public-private key pair B is referred to as private key B.

Referring to FIG. 2A, at operation 210, the endpoint device is configured by the NMS. NMS public key A is typically installed on an endpoint device (Smart Meter (SM)) at the factory. Operation 215 shows an endpoint device deployed in the field, e.g., at a particular geographic location. Before managing an endpoint device in the field, a technician/operator may obtain work orders as described below.

At operation 220, the device manager requests work order(s) from the NMS, and provides public key B, for use in signing messages (e.g., SMP messages) sent to the endpoint device, shown in a subsequent operation below. Public-private key pair B is active for a specified period of time, as determined by the NMS. In some embodiments, the device manager does not automatically generate a public/private key pair. Rather, the public private key pair may be generated by another entity and transferred to the device manager. Additionally, a certificate (generated specifically for the device manager) may be imported into the device manager, allowing the device manager to connect securely (e.g., via HTTPS) to the NMS. For example, a Windows® 2008 server or equivalent may be utilized to generate certificates. Once a certificate has been created, the certificate may be imported into the device manager. In some embodiments, a password may need to be supplied to the device manager to upload the certificate. In some embodiments, the certificate may be viewed after import into the device manager to view various types of information associated with the certificate (e.g., name, issuer name, date of creation, date of expiry, etc.). Accordingly, a technician may securely connect to the NMS 110 (e.g., with HTTPS, etc.) via the device manager 135, using appropriate credentials as provided by the certificate. The device manager 135 may request work order(s) from the NMS, with public key B embedded in the request to the NMS. It is noted that when a request is sent to the NMS, all work orders assigned to a particular technician will be provided. At operation 225, the NMS (after verifying the credentials of the device manager) creates a work order, signed by private key A and also including public key B. The NMS will verify the credentials of the device manager, to confirm that the device manager is authorized to make and receive work order request(s). In some cases, the NMS may implement restrictions in the work order based upon the credentials of a particular technician. The work order generated by the NMS may also include the endpoint device's unique identifier, start time and end time for the validity of the work order, a role identifier, and in some cases, a technician name, etc. Thus, work orders are signed by the NMS, allowing the NMS to delegate configuration/management authority for selected endpoint devices in a limited time window. Work orders are described in additional detail below, with reference to FIG. 3.

Referring to FIG. 2B, the signed work order is then provided to the device manager 135, with the work order containing public key B and signed by private key A, at operation 230. At operation 235, the device manager sends the signed work order to the endpoint device. Upon receiving the work order, the endpoint device may verify the signature of the work order, determine a time window of validity and confirm that the work order contains the proper identifier for the endpoint device as well as set up a user role. Validation of the work order, using public key A, signifies to the endpoint device that the work order has not been modified or tampered with since being deployed by the NMS. If valid, the endpoint device extracts and installs public key B (the device manager's public key) from the work order for the time window specified in the work order. Thus, the device manager may temporarily install its public key on the endpoint device for use in verifying the signature of SMP messages from the device manager. At operation 240, the device manager signs subsequent communications/messages associated with the work order to endpoint device with private key B (the private key associated with the public key B in the work order).

Turning now to FIG. 2C, at operation 245, the endpoint device validates communications from the device manager associated with the work order using public key B. At operation 250, the endpoint device removes public key B, thereby invalidating the work order, when the specified period of time expires or upon receiving a command from the device manager (or NMS, if a network connection is available) to do so.

The endpoint device is authorized to communicate with, and in particular, accept messages from the device manager during a specific time window.

The cryptographic security mechanisms used to generate public-private key pairs rely on establishing a chain of trust to the NMS. By using a key-pair to sign/validate the public key of another key-pair, a chain of trust can be established. Additionally, by using an ECDSA-based mechanism for signing SMP commands from the device manager, endpoint devices can utilize the same mechanism for validating commands from the device manager as for authenticating SMP commands directly from the NMS.

These techniques build on signature mechanisms to sign SMP messages for secure session establishment/management. Existing grid mesh products support signed SMP messages by including a signature TLV that contains an ECC/ECDSA signature of the SMP message. For example, when using ECDSA, the signature may contain the output from generating the ECDSA signature over the entire SMP message (excluding the Signature TLV). Endpoint devices may use the NMS ECC public key to verify the SMP Signature TLV sent by the device manager. The NMS ECC private key is usually secured using external hardware based security modules.

Any suitable cryptographic technique that is compatible with the hardware constraints of the endpoint device may be used in connection with the techniques presented herein. Some other possible approaches to securing messages (e.g., CoAP with Datagram Transport Layer Security to provide security for datagram protocols, etc.), may incur significantly higher resource overhead, and thus, may not be compatible with resource limited environments.

Figure 3:
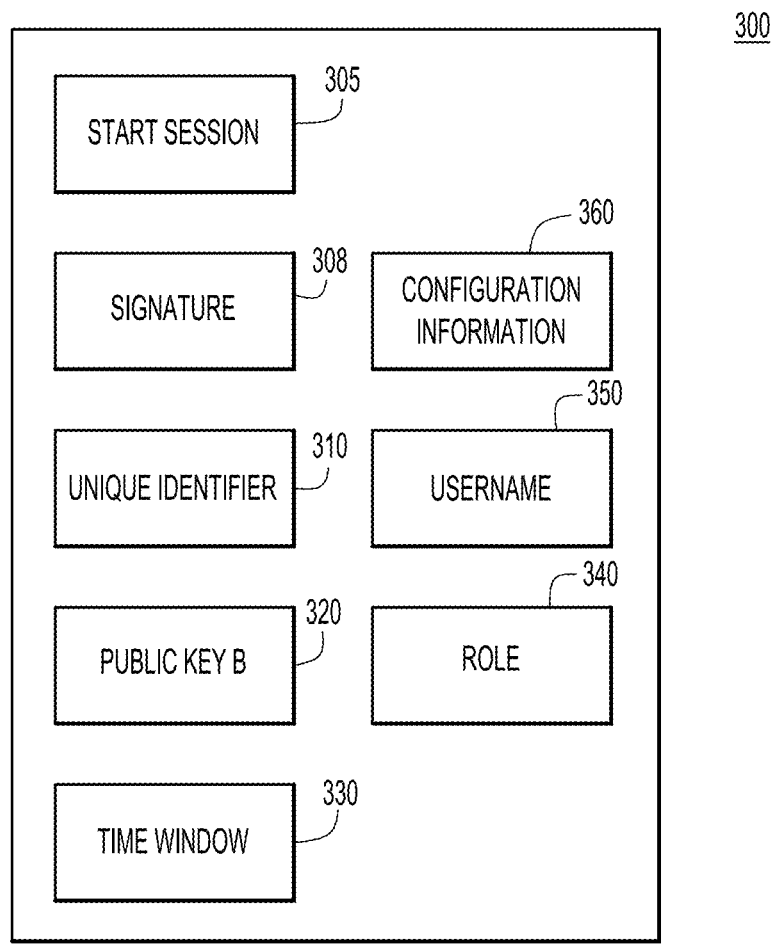
FIG. 3 is a diagram showing elements of a work order according to an example embodiment.

Reference is now made to FIG. 3. FIG. 3 is a diagram showing an example of various elements of a work order. A work order comprises information used to configure or manage an endpoint device in a secure manner, the information being specific to a particular endpoint device, associated with a particular user role, and valid for a specified period of time. A work order may be a SMP message, comprising a list of fields, such as TLVs. Work orders may also comprise a set of commands, which the endpoint device may execute upon receipt of the work order (without additional interaction with a device manager). Thus, in some implementations, an endpoint device may be updated simply by receiving and executing the work order. Alternatively, a work order may specify the level of control a technician is allowed to have for a particular device, allowing a technician to make updates in an interactive fashion using the device manager. Any combination of these two cases are also understood to be within the scope of the embodiments disclosed herein.

When using SMP, the work order may consist of a SMP message that, in general, contains a command to start the session, e.g., StartDMSession TLV 305 and a Signature TLV 308 used to verify the authenticity of the work order. The work order may comprise a variety of additional fields including a unique identifier 310, public key 320, time window 330 (which may include, e.g., a start date and an end date as well as time zone information), role 340, username 350 (e.g., a technician's username), and configuration information 360 (e.g., config TLVs).

Additionally, work orders created by the NMS may include any of the following additional parameters: device type (e.g., model no. of smart meter device), config group map (e.g., map of config group name and identifier), firmware group map (map of firmware group name and id), config group identifier (ID), firmware group ID, link local address of mesh endpoint, name, EID (unique device ID), and meter ID. Such parameters may be useful for verifying the identity of an endpoint device, and ensuring that a particular work order is performed only on the designated endpoint device. Aside from the StartDMSession TLV, and in some cases, configuration commands, the remaining information in the work order is generally not sent to the endpoint device.

Devices may be grouped for management purposes. Accordingly, two different group types are supported: config group and firmware group. Newly added endpoint devices will be part of a default config group and firmware group. NMS users may create new groups and redistribute or assign endpoint devices accordingly, with the group ID being sent to the endpoint device. As devices may be moved to different groups, NMS and endpoint devices may occasionally be out-of-sync. Sending information, e.g., config group and firmware group, as part of the work order, prevents such confusion, allowing the device manager to compare information received from the NMS and the endpoint device to identify any discrepancies that may need to be resolved.

A link local address may be used to connect to an endpoint device. For example, a device manager can communicate with an endpoint device using a link local IPv6 address.

Unique identifier 310 identifies the endpoint device being managed. Public key 320 is the device manager's public key B, and is used for validating messages between the endpoint device and the device manager during the work session. Time window 330 determines the window of time during which the work order is valid. In some embodiments, the time window may be determined by a start date, e.g., a time stamp indicating the beginning of a valid time period for the work order, and an end date indicating a future point in time specifying the end of the valid time period.

Role 340 is used to limit a class of configurations/commands to a particular user role, providing a degree of flexibility that the operator or technician has with regard to configuring or interacting with the endpoint device. In some cases, the user role may establish a range of values (e.g., a subset of all possible values) for configurations that a technician may be allowed to implement. Alternatively, a technician may not be allowed to alter certain configurations at all. Example user roles may include: (i) an administrative role encompassing all configuration/management commands, (ii) a technician role, including all commands except configuration and reboot commands, and (iii) a viewer role with limited access, etc. Username 350 may be used by the endpoint device to log interactions with other devices.

The work order may also contain configuration information or values 360 dictated by the NMS that includes LLN device configuration parameters to be updated, via the work order generated by the NMS, as well as acceptable values or valid ranges for each device configuration parameter. Configuration information may comprise a series of commands to be executed by the endpoint device.

Additionally, in order to guard against replay attacks, sequence numbers may be used. The sequence number may start at zero for each new work order issued by the NMS, and be numerically incremented for each successive work order. Sequence numbers may also increase with each new work order based on time.

A work order establishes a time-constrained chain of trust. Work orders, as disclosed herein, differ from basic PKI certificates in that the work order contains application-specific information to support the management model of the endpoint device, e.g., Smart Grid AMI device. Additionally, a work order may contain management information only available at the NMS (e.g., configuration group ID, firmware group ID, etc.).

In some embodiments, an X.509 certificate with application-specific extensions may be used as a format for a work order, if resource constraints allow. If an endpoint device is highly resource-constrained, X.509 certificate processing may consume more resources than available, and a more efficient processing format may be used.

It is also noted that technician identity does not need to be used for authorization. LLN endpoint devices do not generally have sufficient resources to keep track of per-user authorizations. Instead, NMS performs the authorization initially, in deciding whether to issue work order(s) to a requester. The device manager honors valid work orders and uses the technician identity for auditing purposes only.

Figure 4:
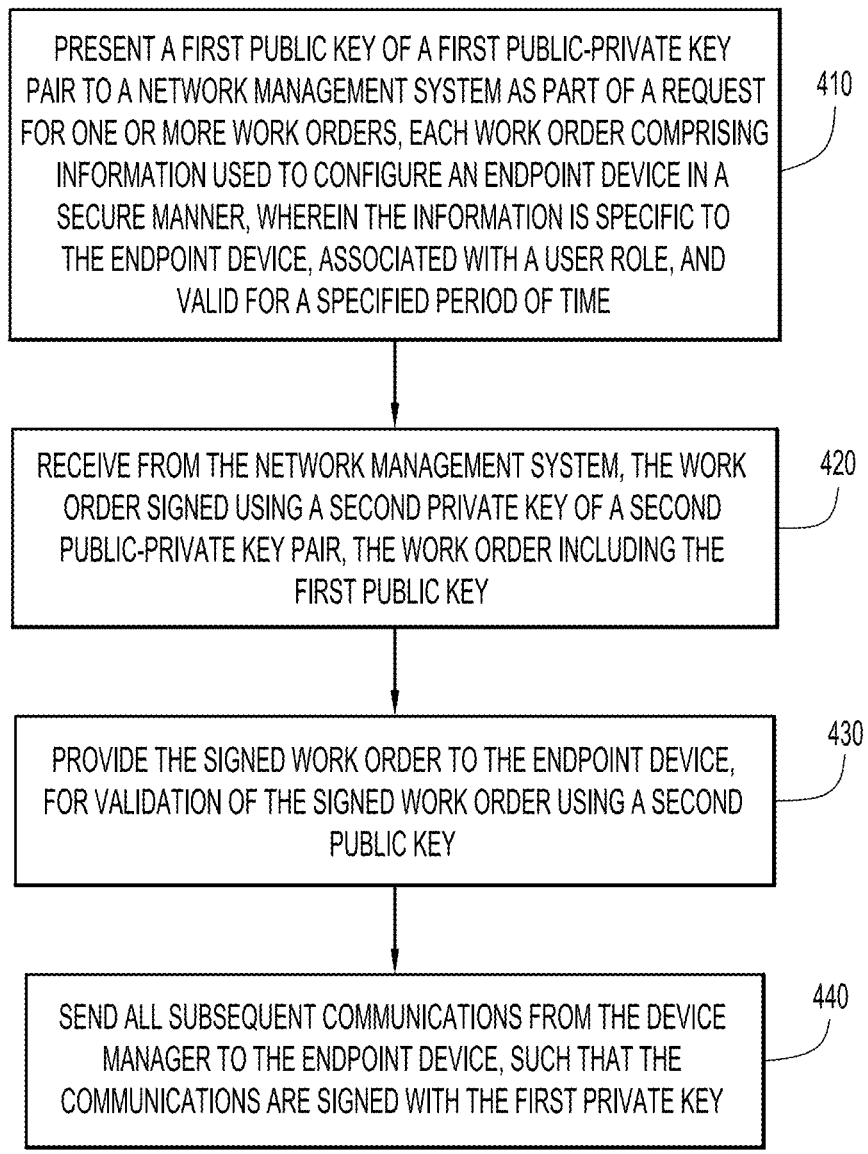
FIG. 4 is a flowchart generally depicting operations of a device manager according to an example embodiment.

FIG. 4 shows a high-level/generalized flowchart of operations performed by a device manager. At 410, a device manager for an endpoint device presents a first public key of a first public-private key pair to a network management system as part of a request for one or more work orders, each work order comprising information used to configure an endpoint device in a secure manner, wherein the information is specific to the endpoint device, associated with a user role, and valid for a specified period of time. At 420, the device manager receives the work order, signed using a second private key of a second public-private key pair. The work order includes the first public key. At 430, the signed work order is provided to the endpoint device for validation of the signed work order using a second public key. At 440, all subsequent communications from the device manager are sent to the endpoint device such that the communications are signed with the first private key.

Figure 5:
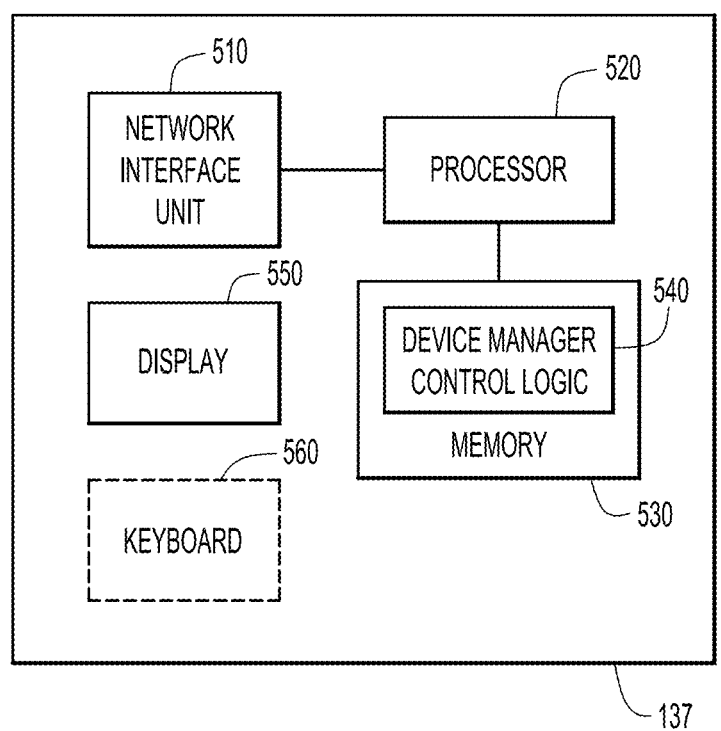
FIG. 5 is a block diagram of an example of an apparatus configured to request one or more work orders and communicate with an endpoint device according to an example embodiment.

FIG. 5 illustrates an example block diagram of user device 137 configured to perform the operations of the device manager 135 as described herein. The user device 137 includes a network interface unit 510, a processor 520, and a memory 530, a display 550, and optionally, a keyboard 560. The network interface unit 510 is configured to enable network communications over a network to send or receive traffic flows between e.g., local area networks and wide area networks. In general, user device 137 may be any portable electronic device, e.g., laptop, smart phone, tablet, etc. capable of communicating with endpoint device 130.

The processor 520 may be embodied by one or more microprocessors or microcontrollers, and executes software instructions stored in memory 530 for device manager control logic 540, to perform the device manager operations described above in connection with FIGS. 1, 2A-2B, 3 and 4.

Memory 530 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 530 may comprise one or more tangible (e.g., non-transitory) computer readable storage media (e.g., a memory device) encoded with software comprising computer executable instructions, and when the software is executed by the processor 520, the processor 520 is operable to perform the operations described herein in connection with the device manager control logic 540.

The functions of the processor 520 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

Display 550 may be used for enabling a technician to communicate with endpoint device 130. In some embodiments, display 550 may be a touchscreen device. In other embodiments, display 550 may be a display device accompanied with a keyboard 560 for entering information in regards to configuration or maintenance of the endpoint device.

Figure 6:
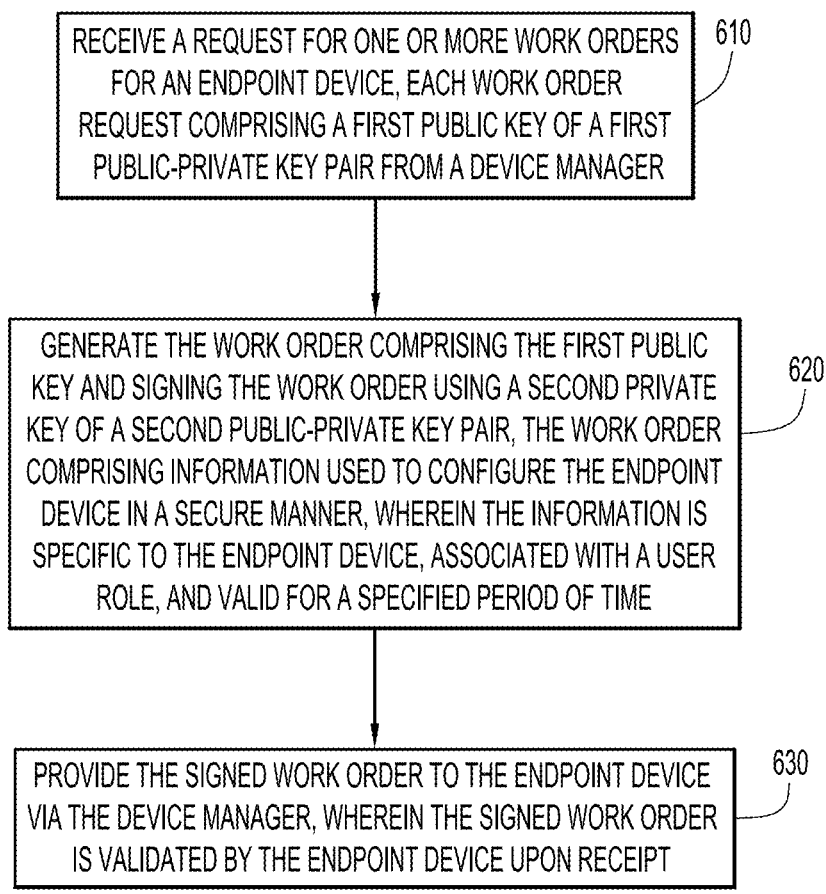
FIG. 6 is a flowchart generally describing the operations of a network management system according to an example embodiment.

FIG. 6 shows a high-level/generalized flowchart depicting operations performed by a network management system in accordance with the techniques presented herein. At operation 610, a request for one or more work orders for an endpoint device, the request comprising a first public key of a first public-private key pair is received from a device manager. At operation 620, the work order is generated, the work order comprising the first public key and signed with a second private key of a second public-private key pair, the work order comprising information used to configure the endpoint device in a secure manner, wherein the information is specific to the endpoint device, associated with a user role, and valid for a specified period of time. At operation 630, the signed work order is provided to the endpoint device via the device manager, wherein the signed work order is validated by the endpoint device upon receipt.

Figure 7:
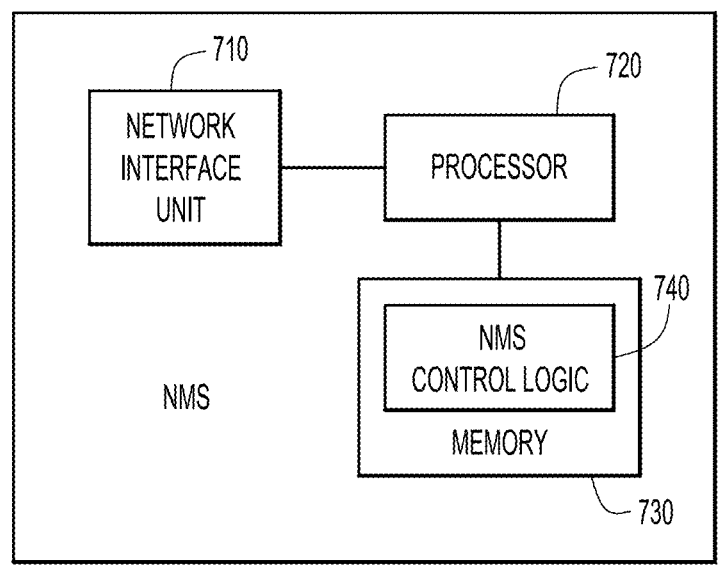
FIG. 7 is a block diagram of an example of an apparatus configured to generate work orders, configure endpoint devices, and communicate with a device manager according to an example embodiment.

FIG. 7 illustrates an example block diagram of the NMS 110 configured to perform the operations presented herein. The NMS 110 includes a network interface unit 710, a processor 720, and a memory 730. The network interface unit 710 is configured to enable network communications over a network to send or receive traffic flows between e.g., local area networks and wide area networks.

The processor 720 may be embodied by one or more microprocessors or microcontrollers, and executes software instructions stored in memory 730 for NMS control logic 740, to perform the NMS operations described above in connection with FIGS. 1, 2A-2B, 3 and 6.

Memory 730 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 730 may comprise one or more tangible (e.g., non-transitory) computer readable storage media (e.g., a memory device) encoded with software comprising computer executable instructions, and when the software is executed by the processor 720, the processor 720 is operable to perform the operations described herein in connection with the NMS control logic 740.

The functions of the processor 720 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

FIG. 8 shows an example screenshot 800 showing a list of work orders generated by a network management system, according to an example embodiment. An individual work order is shown at 810. Components of the work order may include unique identifier 310, time period 330 (e.g., time zone, start date, and end date), role 340 and username 350. Additional parameters (e.g., work order name, status, etc.) may be included in the work order as disclosed herein. It is noted that the screenshots presented herein are used to illustrate aspects of work flows for the techniques disclosed herein. Additional examples of user interfaces having various configurations are understood to fall within the scope of the techniques disclosed herein.

FIG. 9 shows an example screenshot 900 showing a device manager with multiple work orders, according to an example embodiment. An individual work order is shown at 810, which is the same as the work order referred to in FIG. 8. Again, components of the work order may include unique identifier 310, time period 330 as well as additional parameters (e.g., status, device name, etc.) as disclosed herein. Additionally, buttons shown at the bottom of the screen represent various actions that may be performed by the device manager. Button 910 may be used to connect to a smart meter device as part of a work order flow. It is noted that the screenshots presented herein are used to illustrate aspects of work flows for the techniques disclosed herein. Additional examples of user interfaces having various configurations are understood to fall within the scope of the techniques disclosed herein.

The techniques disclosed herein include a method for supporting authorized, time-limited configuration/management interactions between a device manager and an endpoint device, e.g., a Smart Grid AMI device. The method involves a work order flow comprising: (a) an administrator creating one or more work orders (e.g., a row of data in a database table) in an NMS application and assigning the work order to a technician, (b) a technician using the device manager to download all assigned work orders (at this stage, the NMS generates signed work orders based off of the corresponding row of data in the database table) to the device manager application, and (c) a technician selecting a work order generated for a specific endpoint to connect to the endpoint device. The Smart Grid AMI device may validate the work order against the NMS public key A, installing the device manager's public key B, and validating all subsequent messages from the device manager using public key B. Public key B may be removed at the endpoint device, when the time-window expires or when the session is explicitly closed by the device manager or NMS.

Thus, these techniques provide a robust and scalable workflow that allows device managers to securely configure/manage Smart Grid AMI assets without the need for network connectivity once in the field. Not relying on network connectivity allows the device manager to configure/manage endpoint devices where connectivity is not available (e.g., when connectivity to LLN or cellular/WiFi access via device manager is not available). Not relying on shared secret keys (per endpoint device or shared across all devices) removes the risk and overhead of managing shared secret keys. Targeting work orders to specific endpoint devices for a limited time window and according to a specific role limits the scope of damage that can be done in the event a device manager is compromised, lost, or stolen.

The techniques presented herein provide a computer-implemented method, apparatus and computer readable media (storing processor-executable instructions) for, at a device manager for an endpoint device, presenting a first public key of a first public-private key pair to a network management system as part of a request for one or more work orders, each work order comprising information used to configure an endpoint device in a secure manner, wherein the information is specific to the endpoint device, associated with a user role, and valid for a specified period of time. The device manager receives from the network management system the work order signed using a second private key of a second public-private key pair, the work order including the first public key, and provides the signed work order to the endpoint device for validation of the signed work order using a second public key. Once validated, the device manager sends all subsequent communications from the device manager to the endpoint device such that the communications are signed with the first private key. A network interface unit may be configured to send and receive communications over a network.

The techniques presented herein also provide a computer-implemented method, apparatus and computer readable media (storing processor-executable instructions) for, at a network management system, receiving a request for one or more work orders for an endpoint device, the request comprising a first public key of a first public-private key pair from a device manager. The network management system generates the work order comprising the first public key and signs the work order using a second private key of a second public-private key pair, the work order comprising information used to configure and/or manage the endpoint device in a secure manner, wherein the information is specific to the endpoint device, associated with a user role, and valid for a specified period of time. The network management system provides the signed work order to the endpoint device via the device manager, wherein the signed work order is validated by the endpoint device upon receipt. A network interface unit may be configured to send and receive communications over a network.

The above description is intended by way of example only. Various modifications and structural changes may be made therein without departing from the scope of the concepts described herein and within the scope and range of equivalents of the claims. Although the apparatus, system, and computer-implemented method are illustrated and described herein as embodied in one or more specific examples, it is nevertheless not intended to be limited to the details shown, since various modifications and structural changes may be made therein without departing from the scope of the apparatus, system, and computer-implemented method and within the scope and range of equivalents of the claims. Accordingly, it is appropriate that the appended claims be construed broadly and in a manner consistent with the scope of the apparatus, system, and computer-implemented method, as set forth in the following claims.

What is claimed is:

1. A computer-implemented method comprising:
at a device manager for an endpoint device, presenting a first public key of a first public-private key pair associated with the device manager to a network management system as part of a request for one or more work orders, each work order comprising information used to configure or manage an endpoint device in a secure manner, wherein the information is specific to the endpoint device, associated with a user role, and valid for a specified period of time;
receiving from the network management system the work order signed using a second private key of a second public-private key pair associated with the network management system, the work order including the first public key;
providing the signed work order to the endpoint device for validation of the signed work order using a second public key of the second public-private key pair associated with the network management system; and
sending all subsequent communications from the device manager to the endpoint device without relying upon network connectivity to the network management system, such that the communications are signed with the first private key, the first and second public-private key pairs providing a chain of trust from the network management system to the device manager to the endpoint device that enables the network management system to delegate configuration or management authority to the device manager for the endpoint device.

2. The method of claim 1, wherein receiving further comprises receiving a signed work order comprising information specifying a start time and an end time during which the work order is valid.

3. The method of claim 2, further comprising determining that the specified period of time has expired, and in response, sending a command to the endpoint device to invalidate the work order.

4. The method of claim 1, wherein receiving further comprises receiving the signed work order comprising information specifying a role of the device manager, the role associating specific rights and privileges to the device manager.

5. The method of claim 1, further comprising providing the signed work order to the endpoint device and sending subsequent communications to the endpoint device without communicating with the network management system.

6. The method of claim 1, further comprising configuring the endpoint device, wherein the endpoint device is a smart meter device in a mesh network.

7. A computer-implemented method comprising:
at a network management system, receiving a request from a device manager for one or more work orders for an endpoint device, each work order request comprising a first public key of a first public-private key pair associated with the device manager;
generating the work order comprising the first public key and signing the work order using a second private key of a second public-private key pair associated with the network management system, the work order comprising information used to configure or manage the endpoint device in a secure manner, wherein the information is specific to the endpoint device, associated with a user role, and valid for a specified period of time; and
providing the signed work order to the endpoint device via the device manager without relying upon network connectivity between the endpoint device and the network management system, for validation by the endpoint device upon receipt via a second public key of the second public-private key pair associated with the network management system, the first and second public-private key pairs providing a chain of trust from the network management system to the device manager to the endpoint device that enables the network management system to delegate configuration or management authority to the device manager for the endpoint device.

8. The method of claim 7, further comprising configuring an endpoint device, prior to field deployment of the endpoint device.

9. The method of claim 7, wherein generating further comprises generating a signed work order comprising information specifying a start time and an end time during which the work order is valid.

10. The method of claim 7, wherein generating further comprises generating a signed work order comprising information specifying a user role to the device manager, the role associating specific rights and privileges to the device manager.

11. An apparatus comprising:
a network interface unit configured to send and receive communications over a network; and
one or more processors coupled to the network interface unit, and configured to:
on behalf of a device manager on a user device, present, a first public key of a first public-private key pair associated with the device manager to a network management system as part of a request for one or more work orders for an endpoint device, each work order comprising information used to configure or manage an endpoint device in a secure manner, wherein the information is specific to the endpoint device, associated with a user role, and valid for a specified period of time;

obtain the work order received via the network interface unit from the network management system, the work order signed using a second private key of a second public-private key pair associated with the network management device, and the work order including the first public key;

provide the signed work order to the endpoint device without relying upon network connectivity to the network management system, for validation of the signed work order using a second public key of the second public-private key pair associated with the network management system; and cause all subsequent communications from the device manager to the endpoint device to be signed with the first private key, the first and second public-private key pairs providing a chain of trust from the network management system to the device manager to the endpoint device that enables the network management system to delegate configuration or management authority to the device manager for the endpoint device.

12. The apparatus of claim 11, wherein the processor is further configured to obtain from the signed work order information specifying a start time and an end time during which the work order is valid.

13. The apparatus of claim 12, wherein the processor is further configured to determine that the specified period of time has expired, and in response, send a command to the endpoint device to invalidate the work order.

14. The apparatus of claim 11, wherein the processor is further configured to obtain from the signed work order information specifying a role of the device manager, the role associating specific rights and privileges to the device manager.

15. The apparatus of claim 11, wherein the processor is further configured to provide the signed work order to the endpoint device and send subsequent communications to the endpoint device without communicating with the network management system.

16. The apparatus of claim 11, wherein the processor is further configured to configure the endpoint device, wherein the endpoint device is a smart meter device in a mesh network.

17. An apparatus comprising:
a network interface unit configured to send and receive communications of a network management system over a network; and
one or more processors coupled to the network interface unit, and configured to:
  obtain via the network interface unit a request received from a device manager on a user device for one or more work orders from the network management system for an endpoint device, each work order request comprising a first public key of a first public-private key pair associated with the device manager;
  generate the work order comprising the first public key and sign the work order using a second private key of a second public-private key pair associated with the network management system, the work order comprising information used to configure or manage the endpoint device in a secure manner, wherein the information is specific to the endpoint device, associated with a user role, and valid for a specified period of time; and
  provide the signed work order to the endpoint device via the device manager without relying upon network connectivity between the endpoint device and the network management system, for validation by the endpoint device upon receipt via a second public key of the second public-private key pair associated with the network management system, the first and second public-private key pairs providing a chain of trust from the network management system to the device manager to the endpoint device that enables the network management system to delegate configuration or management authority to the device manager for the endpoint device.

18. The apparatus of claim 17, wherein the processor is further configured to configure the endpoint device, prior to field deployment of the endpoint device.

19. The apparatus of claim 17, wherein the processor is further configured to generate the signed work order comprising information specifying a start time and an end time during which the work order is valid.

20. The apparatus of claim 17, wherein the processor is further configured to generate the signed work order comprising information specifying a user role to the device manager, the role associating specific rights and privileges to the device manager.

* * * * *